UNITED STATES PATENT OFFICE.

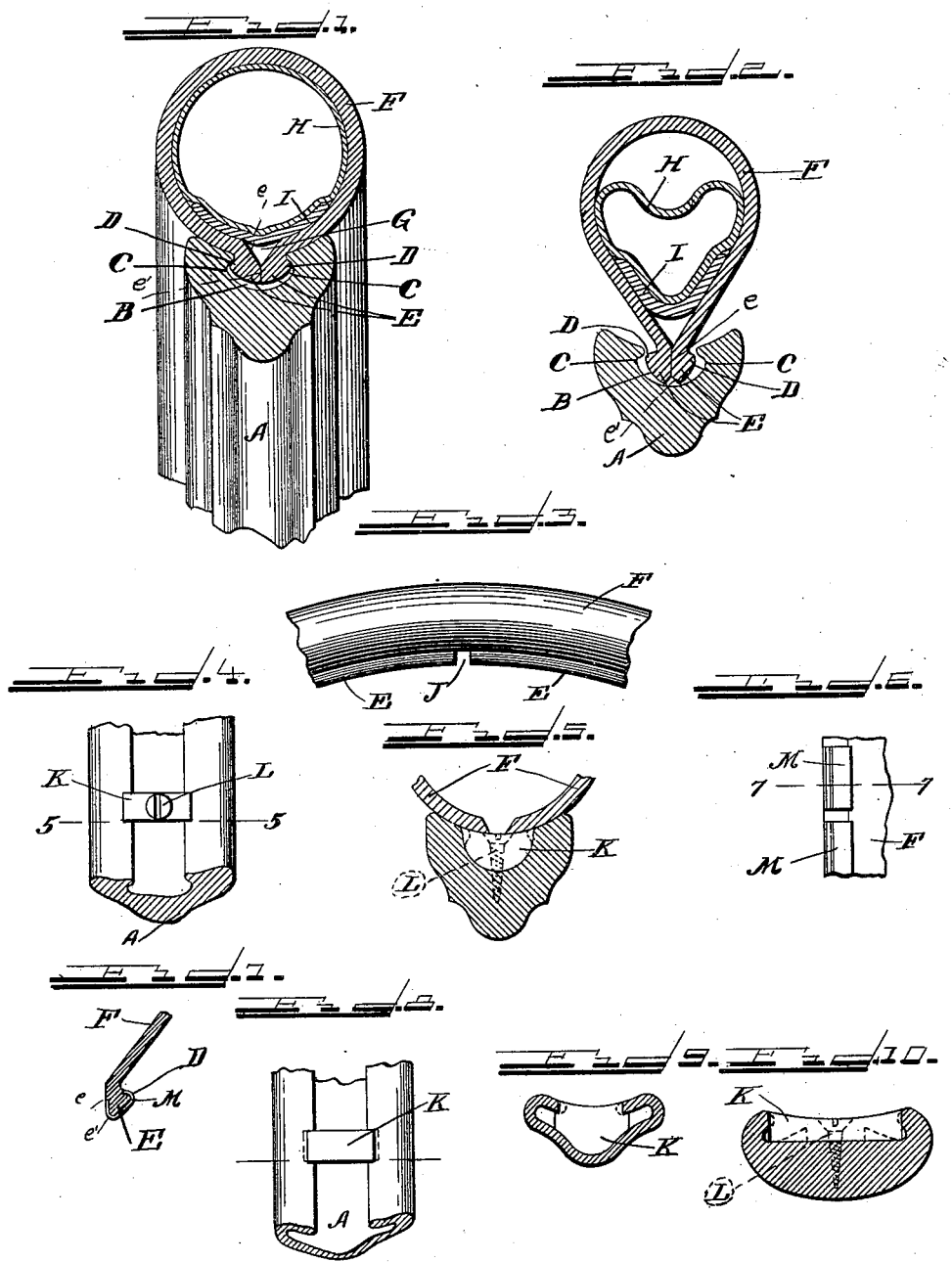

HERBERT E. IRWIN, OF GALESBURG, ILLINOIS.

DETACHABLE TIRE.

SPECIFICATION forming part of Letters Patent No. 680,486, dated August 13, 1901.

Application filed July 14, 1900. Serial No. 23,628. (No model.)

*To all whom it may concern:*

Be it known that I, HERBERT E. IRWIN, a citizen of the United States, residing at Galesburg, in the county of Knox and State of Illinois, have invented certain new and useful Improvements in Detachable Tires, of which the following is a specification.

This invention relates to improvements in that class of double-tube pneumatic tires that are readily detachable from the wheel-rim, and has for its primary object to combine simplicity, durability, and ready detachability in such a tire, as well as to have it capable of use upon automobiles and other power-propelled vehicles, as well as upon bicycles, tricycles, and the like.

Other objects of my invention are to have the tire securely attached to the rim with or without inflation of the inner tube, to provide a good seat for the inner tube, notwithstanding the separation of the opposing edges of the outer tube or casing when applied to a wheel-rim, to positively prevent creeping of the tire upon the rim, and to provide a tire readily adaptable to either a wooden or metallic rim without material diminution of the strength of the rim and which may, if desired, be cemented to the rim.

These and such other objects as may hereafter appear are attained by the devices illustrated in the accompanying drawings, in which—

Figure 1 is a transverse section of a wheel rim and tire embodying my invention, showing the inner tube inflated. Fig. 2 is a view similar to Fig. 1, but showing the inner tube deflated. Fig. 3 is a side elevation of a segment of a tire. Fig. 4 is a detail plan view of a section of the rim. Fig. 5 is a vertical section on the line 5 5 of Fig. 4, but showing the tire in place. Fig. 6 is a detail view of one edge of the tire, showing the reinforcing-bands applied thereto. Fig. 7 is a section on the line 7 7 of Fig. 6. Figs. 8, 9, and 10 are detail views showing the application of my invention to a metallic rim.

Similar letters of reference indicate the same parts in the several figures of the drawings.

Referring by letter to the accompanying drawings, A indicates a wheel-rim, made of wood or other suitable material, having a circumferential groove B in the periphery thereof, which groove is undercut at its sides, as shown at C, for the reception of beads D on the outer sides of lips or flanges E, proceeding from the margins of the split outer tube or casing F of the tire. Each of said lips or flanges has on its inner side directly opposite the bead D a surface $e$, which recedes with respect to the inner surface of the casing proper, so that when the two parts are assembled, as shown in Fig. 1, the surfaces $e$ of the two lips will form between them a substantially V-shaped opening or space. Each of said lips or flanges has also on its inner surface and beyond the surface $e$ a surface $e'$. When the parts are assembled, the surfaces $e'$ engage each other and prevent the lips or flanges E from approaching each other, whereby the beads D are held in engagement with the overhanging flanges resulting from the undercut portions C of the groove in the rim. The surfaces $e\,e$ and $e'\,e'$ are arranged and adapted for reciprocal engagement—that is to say, while the surfaces $e\,e$ are in engagement the surfaces $e'\,e'$ are out of engagement, and vice versa. The points or angles at the junction of $e$ and $e'$ act as reciprocal bearings, about which the parts move from one of the above-described relations to the other—that is to say, assuming the surfaces $e$ and $e$ to be in engagement, as the parts move to disengage them and engage the surfaces $e'\,e'$ they will rock about the points at the junctions of the surfaces $e$ and $e'$, and vice versa. The width of the groove at its narrowest point is a trifle greater than the aggregate width of the lips or flanges E, considered in lines perpendicular to the surfaces $e$ and cutting the summits of the beads D, so that when said surfaces $e$ are brought together, as shown in Fig. 2, the lips or flanges, with their beads, may both be simultaneously inserted in or removed from the groove. The depth of the groove is sufficient to allow the lips to enter when thus placed—*i. e.*, with the surfaces $e$ in engagement with each other—bringing the beads opposite the undercut portions of the groove, and this will leave a slight space between the lips or flanges and the bottom of the groove when the surfaces $e$ are separated and the surfaces $e'$ in engagement, as shown in Fig. 1. Laid around inside of the outer casing and between it and the inner inflatable tube H is a stiff and comparatively thick endless band I, which spans the slit or space between the split edges of the casing and extends a sufficient distance on either side thereof to absolutely insure against the possible protrusion of the inner inflatable tire through the slit in the outer casing when inflated, and also affording a substantial rest for the inner tube as against undue wear upon the edges of the outer casing.

No special fastening devices are needed to retain the tire in position upon the rim, because the natural tendency to distend of the outer casing will serve to hold the beads thereon in engagement with the undercut sides of the groove whether the inner tube is distended or not. When, however, it is desired to detach the tire from the rim, it is only necessary to deflate the inner tube and then by force compress the outer tube or casing to the unnatural position shown in Fig. 2, bringing the receding surfaces e of the marginal lips or flanges of the outer casing in contact with each other, at the same time withdrawing the beads from engagement with the sides of the groove, and thus permit the ready detachment of the tire. Of course it is not necessary to force both of the flanges toward the center, as is illustrated in the drawings, because the same result can be accomplished by simply forcing one flange toward the other and releasing one bead at a time.

In practice great difficulty is encountered, especially in the case of driving-wheels, such as those upon an automobile, due to the creeping of the tire upon the rim, causing a break in the valve-stem or the displacement of the tire, and to overcome this I cut through the flanges E at intervals transversely, as shown at J in Fig. 3, and at corresponding places in the rim I insert dams K, which may be of any shape or material, preferably small rectangular metallic pieces, such as is shown in Figs. 4 and 5, fastened to the rim by a screw L and let in at its sides into the material of the rim. As the thick and relatively stiff flanges straddle these dams, the tire is absolutely insured against creeping or any change of position upon the rim. I also find it of advantage, especially where the tire is subjected to heavy work, to apply reinforcing-bands M, composed of thin metal fitting the flanges, said bands being made in such short lengths as may be found best adapted to give sufficient rigidity to the flanges without detriment to the tire.

In Fig. 10 I have simply shown a different form of rim and dam, but in other respects operating in the same manner as that previously described.

In Figs. 8 and 9 I have shown the metallic rim bent to conform to the requirements of the tire, which may be applied thereto and detached therefrom in the same manner as I have described for the wooden rim. In this form instead of the dams K being fastened by screws or like devices to the rim they are let into notches in the opposing edges of the rim and secured by springing the rim, which firmly holds them in place, the ends of the dams projecting under the edges of the rim, as plainly shown in the drawings.

Changes in the form of the rims as well as the engaging flanges may be made without departing from the spirit of my invention, and all such changes are contemplated by the following claims.

Having thus described my invention, what I claim, and desire to secure by Letters Patent, is—

1. The combination with a wheel-rim provided with a peripheral groove, which is undercut at its sides, of a tire-casing provided with marginal lips or flanges, each of said flanges having on its outside a bead and having on its inside a surface e which is opposite said bead and recedes with relation to the inner surface of the outer casing, proper, and having also on its inside, and beyond the surface e, a surface e', said surfaces e and e' being adapted and arranged for reciprocal engagement so that when the parts are assembled in normal relations, the surfaces e' will be in engagement and the surfaces e will leave between them a substantially V-shaped space, and so that when the surfaces e are brought together the surfaces e' will be separated, allowing the beads to disengage from the overhanging flanges of the rim, substantially as described.

2. The combination with a wheel-rim provided with a peripheral groove which is undercut at its sides, of a split tire-casing provided with marginal lips or flanges, each of said flanges having on the outside a bead adapted to enter the undercut portion of said groove and having on its inside, opposite said bead, a surface which recedes with relation to the inner surfaces of the outer casing proper, so that when the parts are in normal relations a substantially V-shaped space will be left between said surfaces, said lips or flanges having beyond said surfaces other surfaces that are in engagement with each other when the parts are in normal relations, an inflated inner tube, and a stiff, endless band entirely separate from the casing, interposed between said casing and the inner tube and spanning the substantially V-shaped space aforesaid, substantially as described.

3. The combination with a wheel-rim provided with a peripheral groove which is undercut at its sides, of a tire-casing split around its inner side and provided with peripheral flanges adjacent to said split, having beads thereon fitting into the undercut portions of said groove, the opposing edges of the casing being oppositely inclined or curved, the inner inflatable tube, and a stiff endless band interposed between said tube and the split in the casing, substantially as described.

4. The combination with a wheel-rim provided with a peripheral groove which is undercut at its sides, of a tire-casing split around its inner side and provided with flanges adjacent to said split, having beads thereon fitting into the undercut portions of said groove, metallic reinforcing-bands on said flanges, and a transverse dam or projection in said groove, the flanges being provided with corresponding transverse notches adapted and arranged to receive said dam or projection, substantially as described.

5. The combination with a wheel-rim provided with a peripheral groove which is undercut at its sides, of a tire-casing split around its inner side and provided with peripheral flanges adjacent to said split, having beads thereon fitting into the undercut portions of said groove, the opposing edges of the casing being oppositely inclined or curved, and metallic reinforcing-bands on said flanges, substantially as described.

6. The combination with a wheel-rim provided with a peripheral groove which is undercut at its sides, of a tire-casing split around its inner side and provided with peripheral flanges adjacent to said split, having beads thereon fitting into the undercut portions of said groove, and metallic reinforcing-bands on said flanges formed in longitudinal sections, substantially as described.

HERBERT E. IRWIN.

Witnesses:
L. T. STONE,
GEO. A. TRYON.